United States Patent
Sakamoto et al.

(10) Patent No.: US 6,368,118 B1
(45) Date of Patent: Apr. 9, 2002

(54) ELECTRIC CONNECTION BOX

(75) Inventors: Masami Sakamoto; Tamotsu Onoe; Masaharu Hayashi, all of Aichi-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/626,393

(22) Filed: Jul. 26, 2000

(30) Foreign Application Priority Data

Jul. 21, 1999 (JP) .......................................... 11-212331
Jul. 27, 1999 (JP) .......................................... 11-212356

(51) Int. Cl.$^7$ ................................................ H05K 1/00
(52) U.S. Cl. ..................................... 439/76.2; 439/688
(58) Field of Search .............................. 439/76.2, 76.1, 439/724, 65, 66, 69, 364, 271

(56) References Cited

U.S. PATENT DOCUMENTS 5,057,026 A * 10/1991 Sawai et al. ................... 439/76
5,707,243 A * 1/1998 Endo et al. ................. 439/76.2

FOREIGN PATENT DOCUMENTS

JP        6-80318     3/1994

* cited by examiner

*Primary Examiner*—Renee Luebke
*Assistant Examiner*—Larisa Tsukerman
(74) *Attorney, Agent, or Firm*—Finnegan, Henderson, Farabow, Garrett & Dunner, L.L.P.

(57) ABSTRACT

An electric connection box for connecting a plurality of sub-wire harnesses is disclosed. The electronic connection box comprises a power supply section, a plurality of sub-wire harness connection plates, a plurality of intermediate connection terminals, and a connection section. The power supply section has terminal sections. The plurality of sub-wire harness connection plates are laminated on the power supply section. Each sub-wire harness connection plate has a plurality of set grooves to put electric wires of a sub-wire harness thereinto. Each set groove of sub-wire harness connection plate has a plurality of through holes formed at a bottom thereof and spaced apart from each other in a longitudinal direction thereof. Each intermediate connection terminal is electrically connected to an electric wire of a sub-wire harness and is set in a set groove of a sub-wire harness connection plate so that a through connection conductor connection section thereof is aligned with a through hole of the set groove. The connection section has a plurality of through connection conductors. Each through connection conductor is connected to a terminal section of the power supply section after being inserted through a predetermined through hole in each of the sub-wire harness connection plates and connected to each through connection conductor connection section aligned with the predetermined through hole.

11 Claims, 8 Drawing Sheets

ELECTRIC CONNECTION BOX

RELATED APPLICATION

This application is related to co-pending application Ser. No. 09/640,174.

BACKGROUND OF THE INVENTION

1. Field of the Invention

The present invention relates to an electric connection box which is used for interconnection or the like of wire harnesses and supplies electricity.

2. Description of the Related Art

An electric connection box adopts a structure having a power supply section which has a predetermined circuit composed of a bus bar, electric wire wiring or the like, and a plurality of connector housings for connecting wire harnesses.

In recent years, as electric equipments which are provided to automobiles increase, a wire harness is constituted as sub-wire harnesses which are divided per function of the electric equipments. The wire harness is divided into sub-wire harnesses so as to be connected in the electric connection box. As a result, the connection structure of the sub-wire harnesses in the electric connection box becomes complicated, and operability is deteriorated. Further, the quality is possibly unstable.

Figure 1:
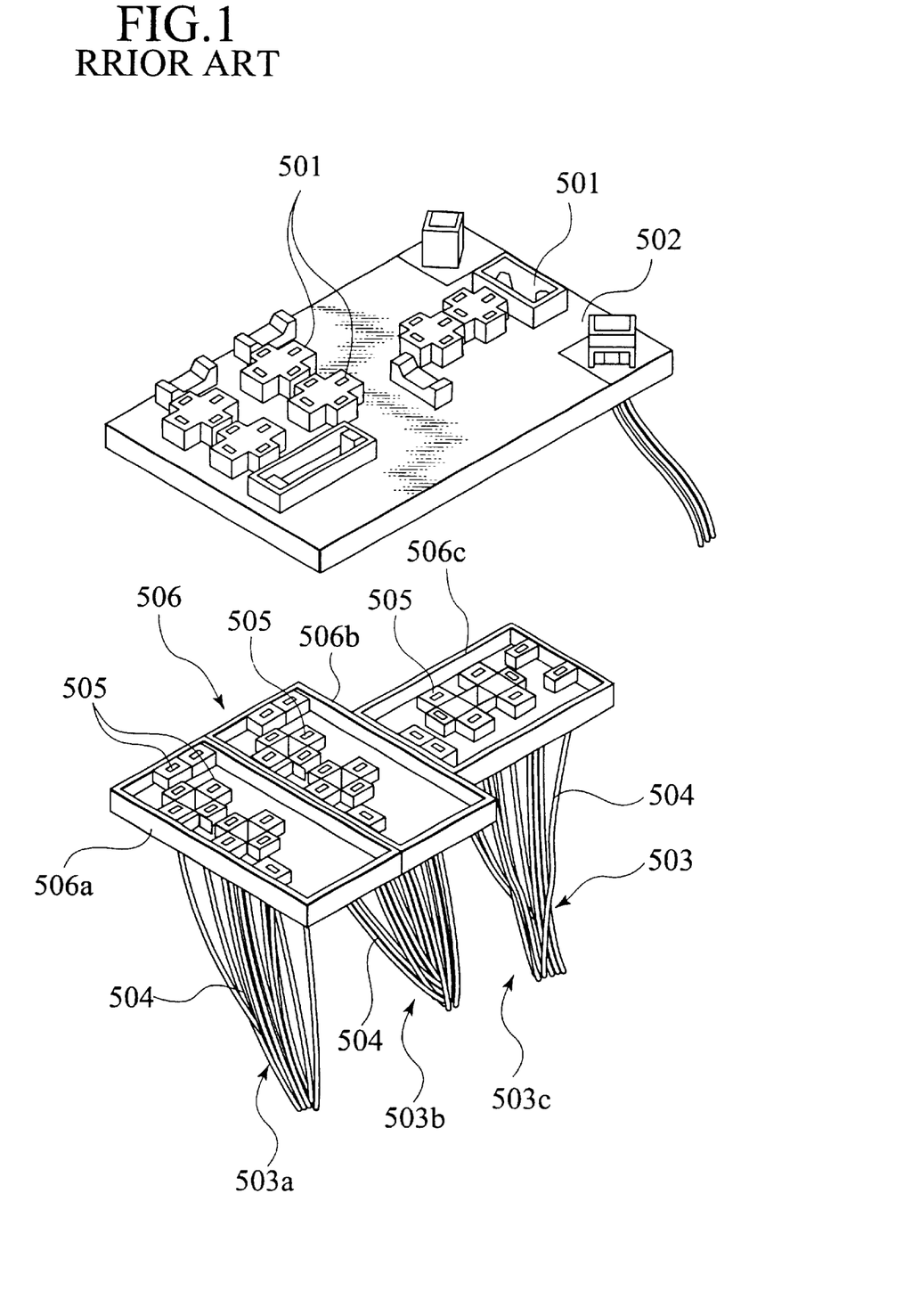
FIG. 1 is an exploded perspective view of an electric connection box according to the related art.

Therefore, in order to simplify the connection of the wire harness, Japanese Utility Model Application Laid-Open No. 6-80318 (1994) discloses an electric connection box where a plurality of sub-wire harnesses composing the wire harness are connected. As shown in FIG. 1, this electric connection box has a cover main body 502 and a rear cover 506. The cover main body 502 is provided with a plurality of cavities 501 for attaching electric parts such as fuse and relay. The rear cover 506 is fixed to the cover main body 502 and is provided with housing sections 505 to which terminals of electric wires 504 composing wire harnesses 503 are attached. A circuit to which the electric parts and electric wire terminals are connected is housed in the cover main body 502 and rear cover 506. The rear cover 506 is divided into rear covers 506a, 506b and 506c for a plurality of sub-wire harnesses correspondingly to the sub-wire harnesses 503a, 503b and 503c which are sorted according to destination of the wire harness 506, a load system and the like. The plural cavities 501 and circuits are formed into blocks correspondingly to the rear covers 506a, 506b and 506c for the plural sub-wire harnesses.

However, in the electric connection box having such a structure, when a number of the sub-wire harnesses 503a, 503b, 503c . . . increases, a number of the rear covers 506a, 506b, 506c . . . for sub-wire harnesses of the electric connection box increases. Since the rear covers 506a, 506b, 506c . . . for sub-wire harnesses are arranged on a plane, the electric connection box is enlarged and attachment characteristic to an automobile is deteriorated. Moreover, in this electric connection box, since the sub-wire harnesses 503a, 503b and 503c are connected at their terminals via connectors, a number of the connectors to be used increases, and the cost becomes high. Further, since the circuit is configured by bus bar and electric wire wiring in the electric connection box, design change such as a modification of the circuit is difficult, and a contribution degree to the productivity of the wire harness is low.

SUMMARY OF THE INVENTION

It is an object of the present invention to provide an electric connection box which is capable of suppressing enlargement as much as possible even if a number of sub-wire harnesses increases, and increasing a degree of freedom of the attachment to an automobile and making the assembly operation easy.

It is another object of the present invention to provide an electric connection box which is capable of suppressing an increase in a number of connectors to be used even if a number of sub-wire harnesses increases.

It is still another object of the present invention to provide an electric connection box which makes a change in design such as a modification of a circuit so as to be capable of improving productivity of a wire harness.

In accordance with the above objectives, the invention is directed to an electric connection box for connecting a plurality of sub-wire harnesses. The electric connection box comprises a power supply section, a plurality of sub-wire harness connection plates, a plurality of intermediate connection terminals, and a connection section. The power supply section has terminal sections. The plurality of sub-wire harness connection plates are laminated on the power supply section. Each sub-wire harness connection plate has a plurality of set grooves to put electric wires of a sub-wire harness thereinto. Each set groove of sub-wire harness connection plate has a plurality of through holes formed at a bottom thereof and spaced apart from each other in a longitudinal direction thereof. Each intermediate connection terminal is electrically connected to an electric wire of a sub-wire harness and is set in a set groove of a sub-wire harness connection plate so that a through connection conductor connection section thereof is aligned with a through hole of the set groove. The connection section has a plurality of through connection conductors. Each through connection conductor is connected to a terminal section of the power supply section after being inserted through a predetermined through hole in each of the sub-wire harness connection plates and connected to each through connection conductor connection section aligned with the predetermined through hole.

In another aspect and in accordance with the above objectives, the invention is directed to an electric connection box for connecting a plurality of sub-wire harnesses to a power supply section. The electric connection box comprises a plurality of sub-wire harness connection plates, a plurality of intermediate connection terminals, a connection-section, and a plurality of power supply connection connectors. The plurality of sub-wire harness connection plates are laminated to each other. Each sub-wire harness connection plate has a plurality of set grooves to put electric wires of a sub-wire harness thereinto. Each set groove of a sub-wire harness connection plate has a plurality of through holes formed at a bottom thereof and spaced apart from each other in a longitudinal direction thereof. Each intermediate connection terminal is electrically connected to an electric wires of a sub-wire harness and is set in a set groove of a sub-wire harness connection plate so that a through connection conductor connection section thereof is aligned with a through hole. The connection section has a plurality of through connection conductors. Each through connection conductor is inserted through a predetermined through hole in each of the sub-wire harness connection plates and is connected to each through connection conductor connection section aligned with the predetermined through hole. The plurality of power supply connection connectors are connectable to the power supply section. Each power supply connection connector has connection electric wires electrically connected to the intermediate connection terminals in a sub-wire harness connection plate.

It is to be understood that both the foregoing general description and the following detailed description are exemplary and explanatory only and are not restrictive of the invention, as claimed.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters.

FIG. 2 through FIG. 6 show one example of an electric connection box according to embodiments of the present invention. The electric connection box in the embodiment has a power supply section 7, a plurality of sub-wire harness connection plates 8a, 8b and 8c, and a connector section 11. Electric wires 4 of sub-wire harnesses 3a, 3b and 3c are put respectively through the sub wire harness connection plates 8a, 8b and 8c correspondingly to the sub-wire harnesses 3a, 3b and 3c so as to be parallel. The sub-wire harness connection plates 8a, 8b and 8c are laminated on the power supply section 7. A plurality of through connection conductors 9 are passed through the sub-wire harness connection plates 8a, 8b and 8c so as to be electrically connected to the electric wires 4 and connected to terminal sections 10 of the power supply section 7. As a result, the connector section 11 forms a feed circuit.

Figure 2:
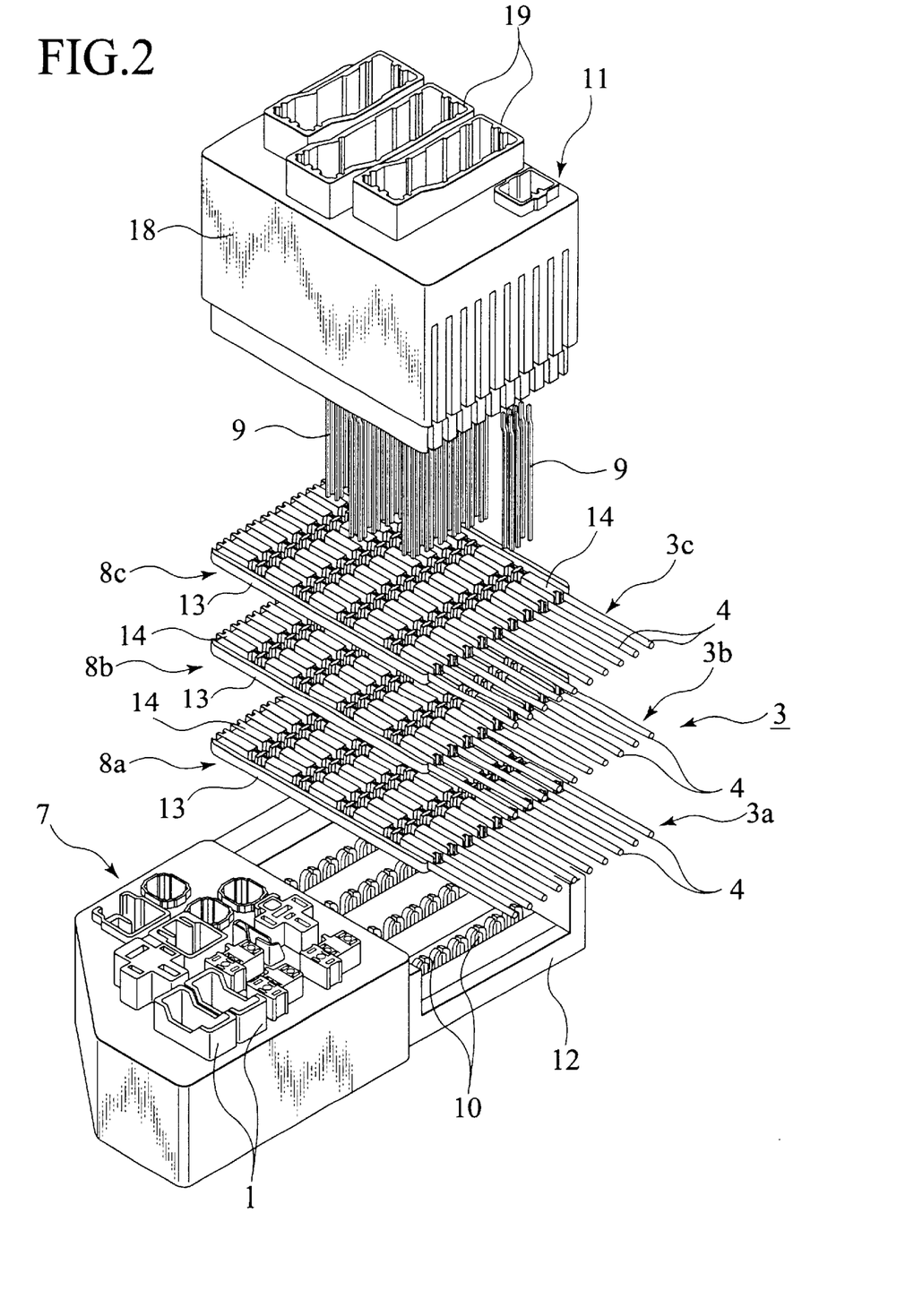
FIG. 2 is an exploded perspective view showing one example of an electric connection box according to an embodiment of the present invention.

A plurality of cavities 1 for attaching electric parts such as fuse and relay are provided to one side of the power supply section 7. A connection plate supporting base section 12, where the terminal sections 10 for feeding electricity to which the through connection conductors 9 are electrically connected are supported to a supporting face in predetermined arrangement, is provided to the side of the power supply section 7 opposite to the one side.

Figure 3:
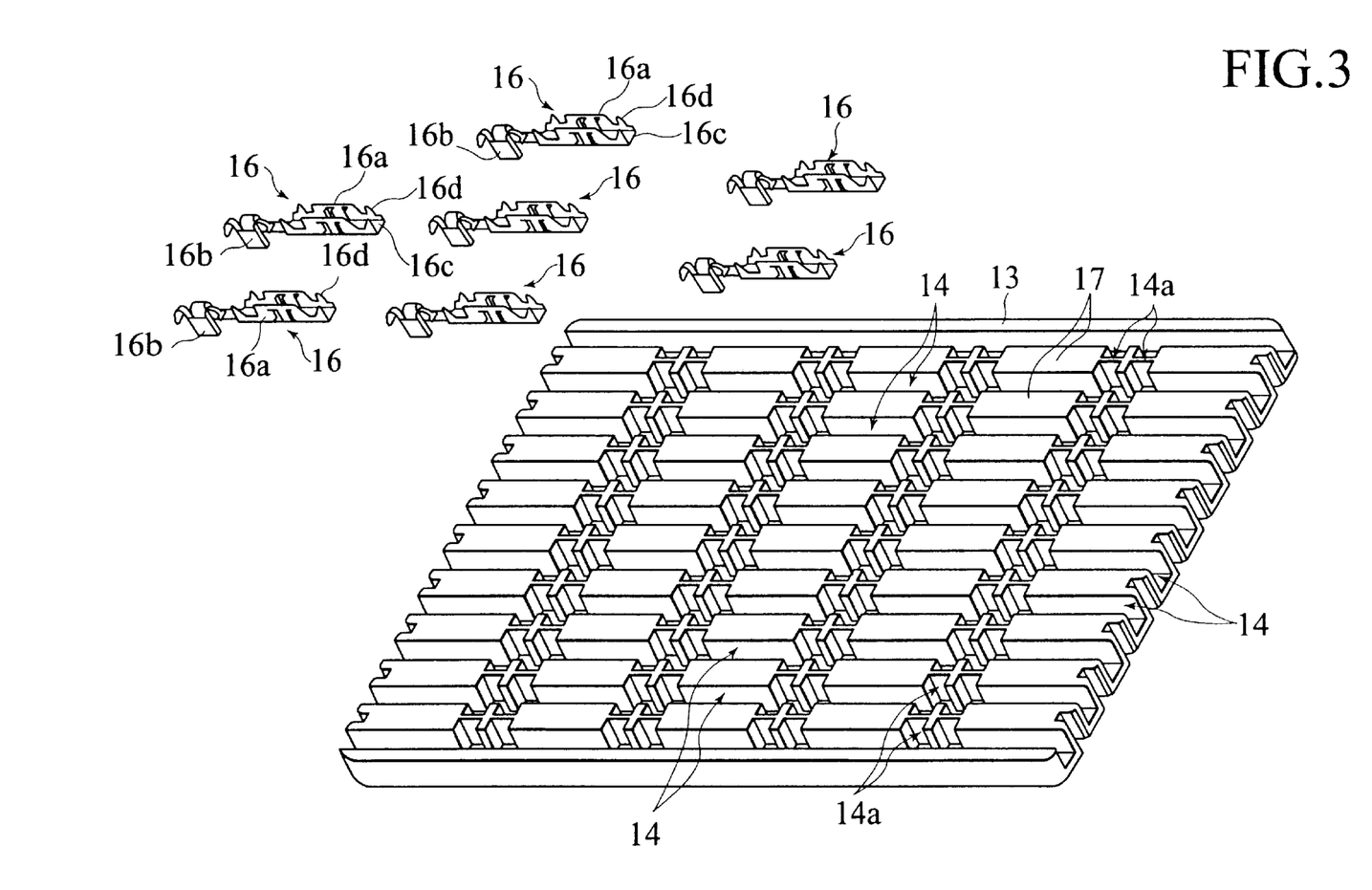
FIG. 3 is a perspective view of an insulating plate which is a sub-wire harness connection plate and an intermediate connection terminal which is set to the insulating plate according to this embodiment.

The sub-wire harness connection plates 8a, 8b and 8c are constituted as follows. Bare conductors 4a of the electric wires 4 composing the sub-wire harnesses 3a, 3b and 3c are put respectively through a plurality of electric wire set grooves 14. The electric wire set grooves 14 are formed on a face of insulating plates 13 so as to be parallel with each other. A plurality of through holes 15 through which the through connection conductors 9 are inserted are formed at bottoms of the electric wire set grooves 14 in their longitudinal direction with predetermined intervals. Intermediate connection terminals 16 are set in arbitrary positions in the electric wire set grooves 14. The intermediate connection terminals 16 have electric wire conductive sections 16a which are electrically connected to the bare conductors 4a of the electric wires 4 put through the electric wire set grooves 14, and through connection conductor connection sections 16b through and to which the through connection conductors 9 are passed and connected respectively.

Figure 4:
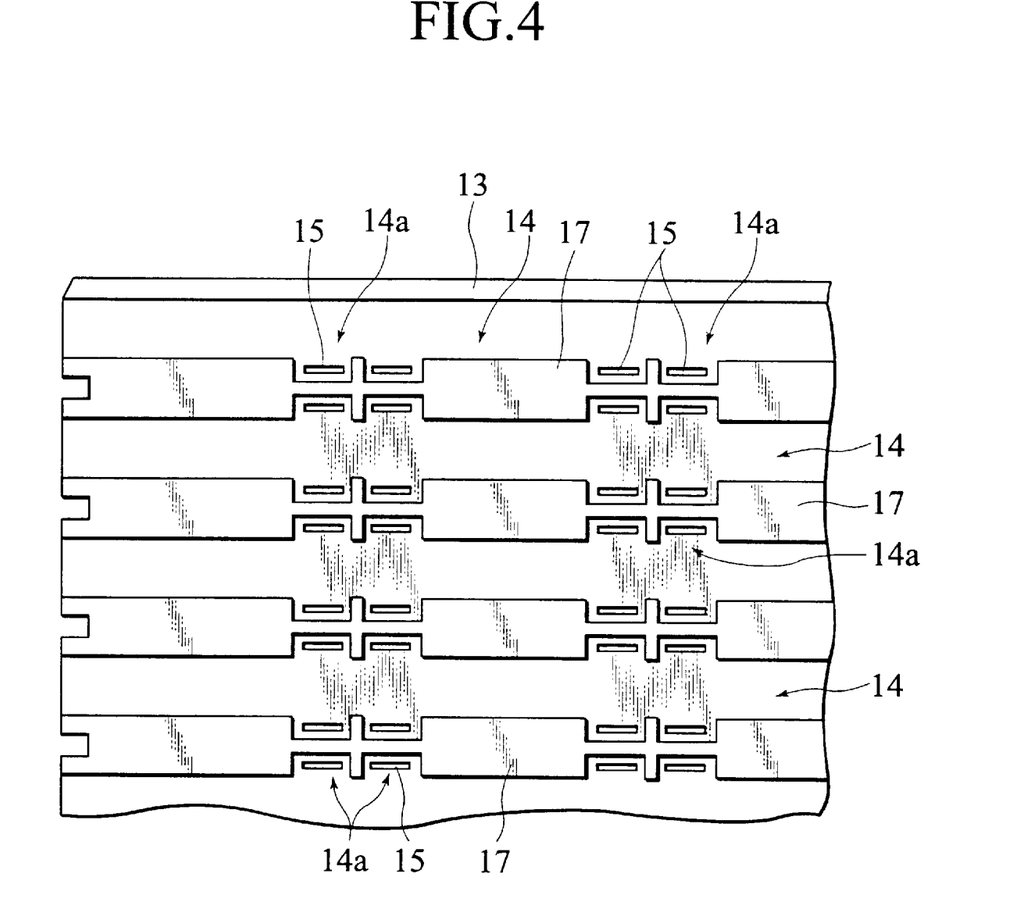
FIG. 4 is a partial plan view of the insulating plate which is the sub-wire harness connection plate according to this embodiment.

More specifically, insulating projections 17 are projected between the electric wire set grooves 14 on the faces of the insulating plates 13. Engagement concave sections 14a, which are connected to the electric wire set grooves 14 so as to compose a part of the electric wire set grooves 14 and are engaged with the through connection conductor connection sections 16b of the intermediate connection terminals 16, are formed on side walls of the insulating projections 17 in the longitudinal direction with predetermined intervals. The through holes 15, through which the through connection conductors 9 are inserted are formed at the bottoms of the engagement concave sections 14a.

Figure 5:
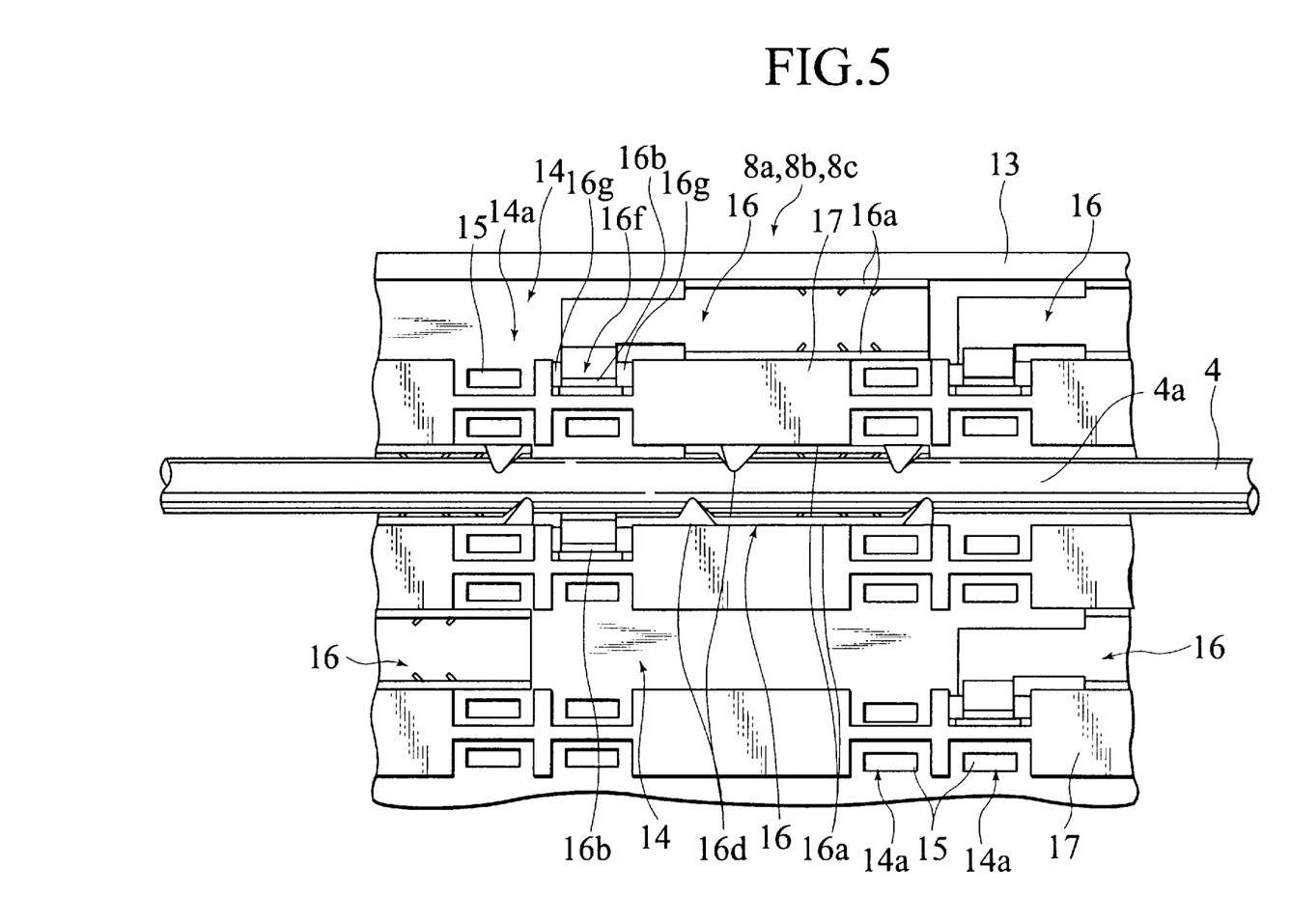
FIG. 5 is a partial plan view showing one example of the state that the intermediate connection terminals are set to the sub-wire harness connection plates to be used in this embodiment and electric wires of the sub-wire harnesses are set to the intermediate connection terminals.
Figure 6:
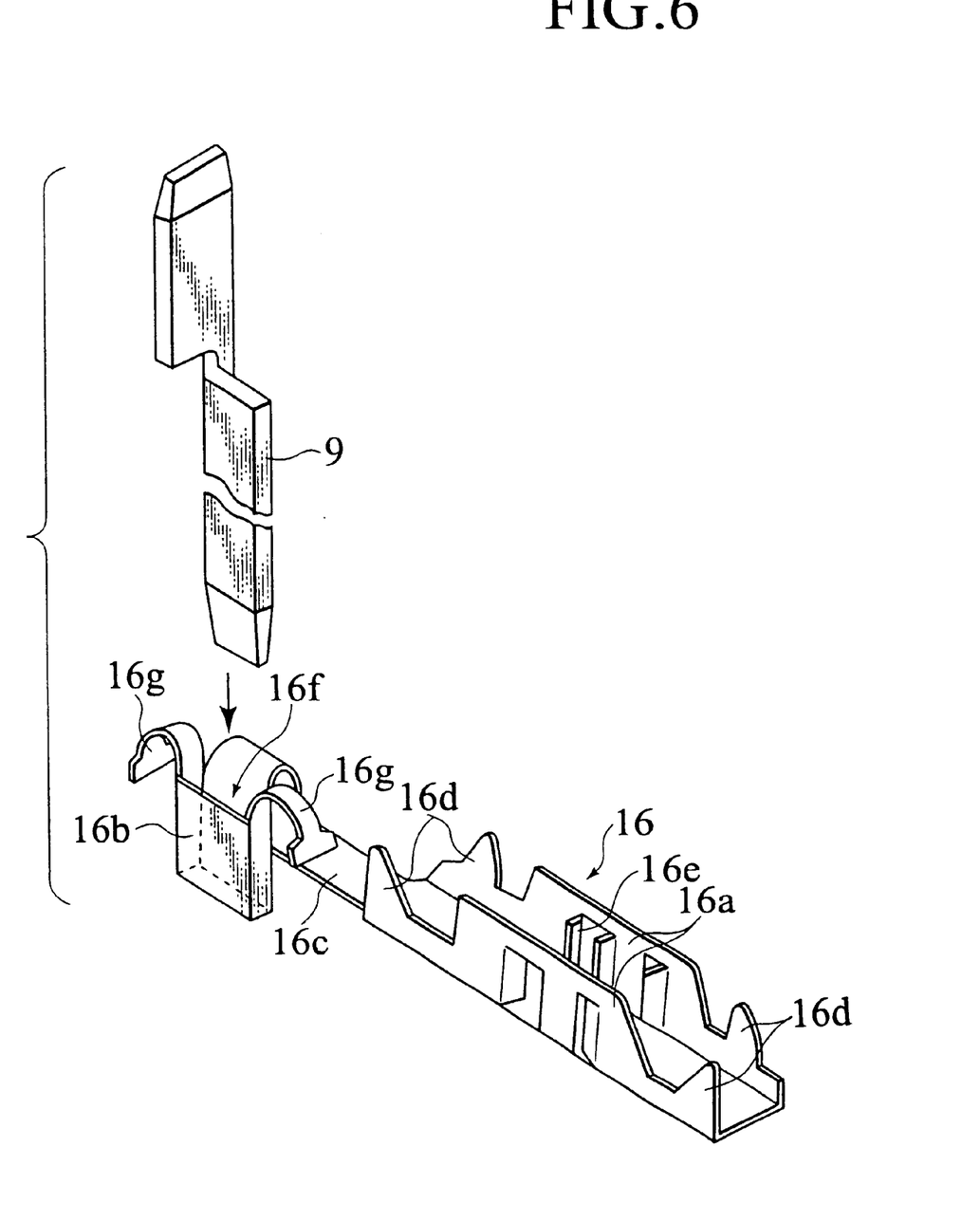
FIG. 6 is a perspective view showing one example of the intermediate connection terminals and through connection conductors which are connected thereto in this embodiment.

In addition, the intermediate connection terminals 16, which are set in the electric wire set grooves 14, have electric wire conductive sections 16a and electric wire holding sections 16d. The electric wire conductive sections 16a and the electric wire holding sections 16d are formed on both sides of one end of bottom plate sections 16c having breadth corresponding to the width of the electric wire set grooves 14 and predetermined length. These sections 16d and 16a rise and are respectively opposed to each other. The electric wires 4 are inserted between the opposed electric wire holding sections 16d. Moreover, through connection conductor connection sections 16b, through and to which the through connection conductors 9 are passed and connected, are extended from one side on the other side of the bottom plate sections 16c.

Conductive projection pieces 16e, which cut into the inserted electric wires 4 so as to contact with the conductors or press-contact with the bare conductors 4a so as to be electrically connected, are formed on inner faces of the electric wire conductive sections 16a. Moreover, the electric wire holding sections 16d hold the electric wires 4 which are bent inward and inserted thereinto.

When the bare conductors 4a of the electric wires 4 are inserted into, the electric wire holding sections 16d serve also as conductive sections which are conductive with the bare conductors 4a.

The through connection conductor connection sections 16b, which are extended from one side on the other side of the bottom plate sections 16c, do not interfere with the through connection conductors 9 which are inserted into the through connection conductor connection sections 16b and with the electric wires 4 which are inserted between the electric wire conductive sections 16a and between the electric wire holding sections 16d. The through connection conductor connection section 16b are engaged with the engagement concave sections 14a, which are formed on the side walls of the insulating projections 17, when the intermediate connection terminals 16 are set in the electric wire set grooves 14. When the engagement is made, drum holes 16f of the through connection conductor connection sections 16b coincide with the through holes 15 which are formed at the bottoms of the engagement concave sections 14a. Moreover elastic pieces 16g are formed on the through connection conductor connection sections 16b. When the through connection conductor connection sections 16b are engaged with the engagement concave sections 14a, the elastic pieces 16g elastically contact with the wall faces of the engagement concave section 14a so as to support the through connection conductor connection sections 16b.

In the intermediate connection terminals 16 of the present embodiment, as shown in FIG. 6, the through connection conductor connection section 16b is extended from the left side of the bottom plate section 16c. However, as not shown in the drawings, it can be extended from the right side or both the left and right sides of the bottom plate section 16c. Moreover, the electric wires 4 of the sub-wire harnesses 3a, 3b and 3c, which are set in the electric wire set grooves 14 of the insulating plates 13 composing the sub-wire harness connection plates 8a, 8b and 8c, may be at the terminals or in the middle.

The sub-wire harness connection plates 8a, 8b and 8c having such a structure are laminated on the connection plate supporting base section 12 of the power supply section 7.

The connector section 11 is constituted so that the through connection conductors 9 which are composed of long tab terminals are supported to an insulating housing 18. The through connection conductors 9 are arranged side by side as a group in positions corresponding to the through holes 15 which are formed at the bottoms of the electric wire set grooves 14 of the sub-wire harness connection plates 8a, 8b and 8c. Connector housings 19 are provided onto the insulating housing 18 so as to surround the terminals of the through connection conductors 9 forming groups as connection terminals.

As shown in FIG. 2, in the electric connection box, the intermediate connection terminals 16 are set in predetermined positions of the electric wire set grooves 14 of the insulating plates 13, and the bare conductors 4a of the electric wires 4 composing the sub-wire harnesses 3a, 3b and 3c are put through and held in the sub-wire harness connection plates 8a, 8b and 8c. The sub-wire harness connection plates 8a, 8b and 8c are laminated on the connection plate supporting base section 12 of the power supply section 7. The through connection conductors 9 of the connector section 11 are inserted respectively through the through holes 15 of the sub-wire harness connection plates 8a, 8b and 8c. The points of the through connection conductors 9 are connected to the terminal sections 10 of the connection plate supporting base section 12. As a result, the through connection conductors 9 are passed through and press-contact with the through connection conductor connection sections 16b which exist in the through holes 15 through which the through connection conductors 9 are passed so as to be electrically connected. The through connection conductors 9 are electrically connected with the bare conductors 4a of the electric wires 4. Further, the through connection conductors 9 are connected to the terminal sections 10 of the power supply section 7. As a result, a three-dimensional feed circuit is configured on the sub-wire harnesses 3a, 3b and 3c which are put through the sub-wire harness connection plates 8a, 8b and 8c.

According to such an electric connection box, when a number of the sub-wire harnesses 3a, 3b, 3c . . . increases, only a number of sub-wire harness connection plates 8a, 8b, 8c . . . to be laminated on the power supply section 7 increases. Even if a number of the sub-wire harnesses 3a, 3b, 3c . . . increases, the enlargement of the electric connection box can be suppressed as much as possible.

The through connection conductors 9 are electrically connected with the bare conductors 4a of the plural electric wires 4 put through the laminated sub-wire harness connection plates 8a, 8b and 8c. As a result, even if a number of the sub-wire harnesses 3a, 3b and 3c increases, an increase in a number of the connectors to be used which form the circuit for connecting the sub-wire harnesses 3a, 3b and 3c to the power supply section 7 can be suppressed. Further, the circuit is configured on the sub-wire harnesses 3a, 3b and 3c put through the sub-wire harness connection plates 8a, 8b and 8c. For this reason, the productivity of the wire harness is improved, and the cost is lowered.

Furthermore, as for the circuit, the set position of the intermediate connection terminals 16 in the electric wire set grooves 14 of the insulating plates 13 and the supporting position of the through connection conductors 9 in the insulating housing 18 of the connector section 11 are determined in required positions or are changed. As a result, the change in design such as a modification of the circuit can be executed easily.

Figure 7:
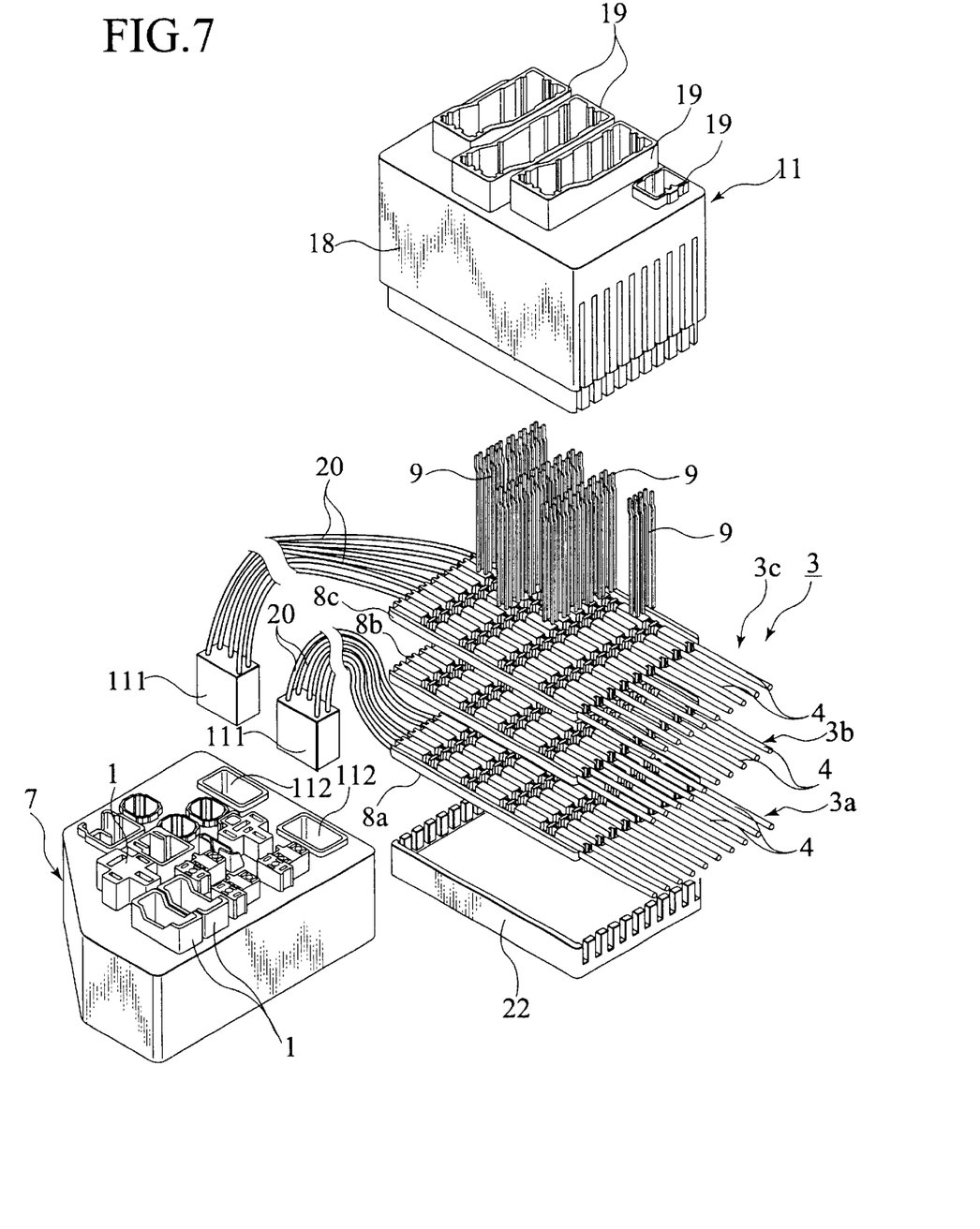
FIG. 7 is an exploded perspective view showing one example of the electric connection box according to a second embodiment of the present invention.

As shown in FIG. 7, the electric connection box according to a second embodiment has a plurality of sub-wire harness connection plates 8a, 8b and 8c, the connector sections 11 and power supply connection connectors 111. The electric wires 4 of the sub-wire harnesses 3a, 3b and 3c are put respectively through the sub-wire harness connection plates 8a, 8b and 8c correspondingly so as to be parallel. The sub-wire harness connection plates 8a, 8b and 8c are laminated. A plurality of through connection conductors 9 are passed through the sub-wire harness connection plates 8a, 8b and 8c so as to be electrically connected with the electric wires 4. As a result, the connector section 11 forms the circuit. The power supply connection connectors 111 are connected to the electric wires 4 of the sub-wire harnesses 3a, 3b and 3c put through the sub-wire harness connection plates 8a, 8b and 8c so as to be connected to the power supply section 7 which is constituted separately. In the present embodiment, the laminated sub-wire harness connection plates 8a, 8b and 8c are sandwiched and held by the connector section 11 and an insulating bottom plate 22. Connection openings 112 to which the power supply connection connectors 111 are connected as well as the cavities 1 for attaching the electric parts such as fuse and relay are provided to the power supply section 7.

The sub-wire harness connection plates 8a, 8b and 8c having such a structure are laminated.

The connector section 11 is constituted so that the through connection conductors 9 composed of long tab terminals are supported to the insulating housing 18. The through connection conductors 9 are arranged as groups side by side in positions corresponding to the through holes 15 formed at the bottoms of the electric wire set grooves 14 of the sub-sire harness connection plates 8a, 8b and 8c. The connector housings 19 are provided to the insulating housing 18 so as to surround the terminal sections of the through connection conductors 9 forming groups as connection terminals.

The power supply connection connectors 111 are connected to the electric wires 4 of the sub-wire harnesses 3a, 3b and 3c which are passed through the sub-wire harness connection plates 8a, 8b and 8c so as to be connected with connection electric wires 20 which are extended by an arbitrary length from the sub-sire harness connection plates 8a, 8b and 8c. The connection electric wires 20 are connected to the electric wires 4 of the sub-wire harnesses 3a, 3b and 3c.

Figure 8:
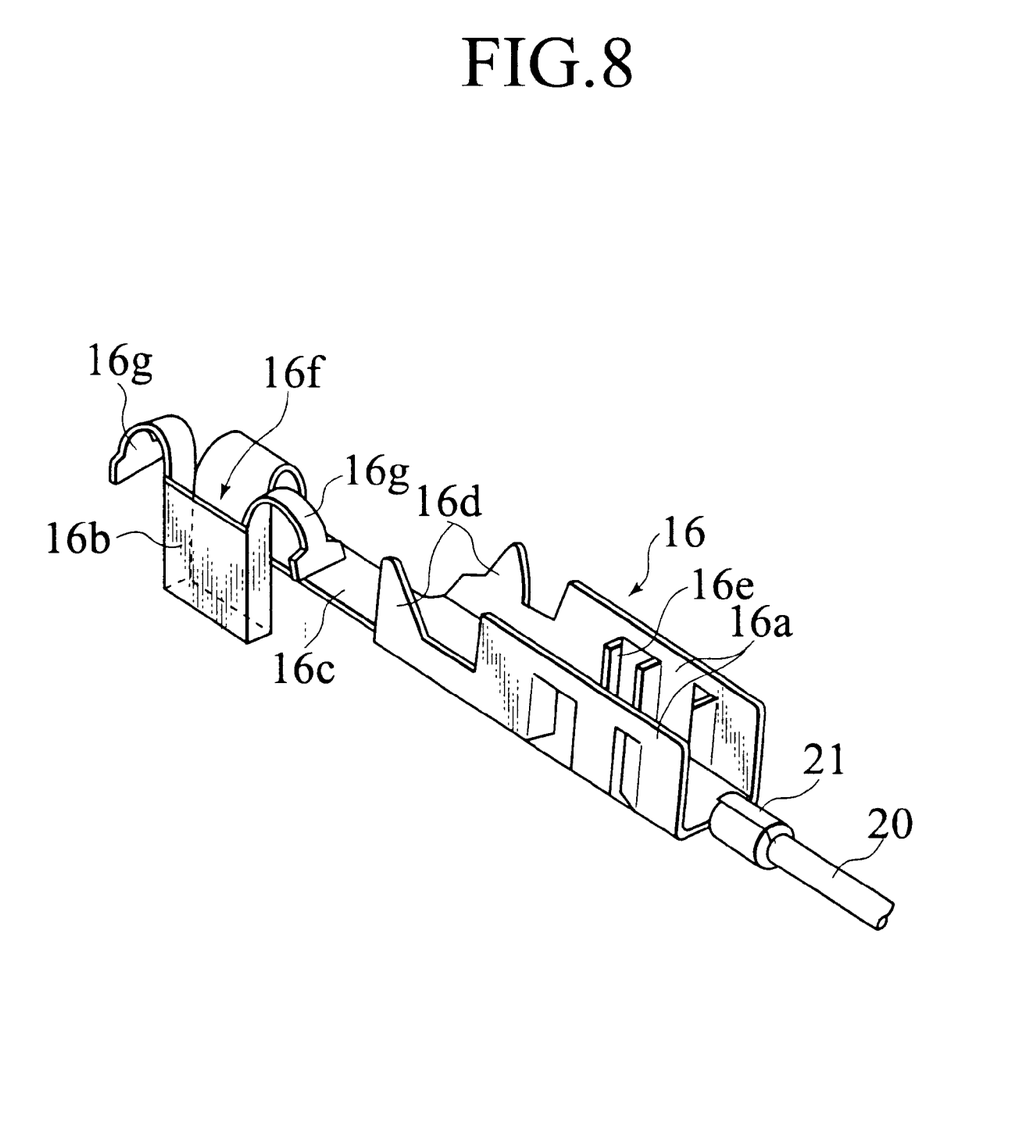
FIG. 8 is a perspective view of the intermediate connection terminal to which a connection electric wire of a power supply connection connector is connected.

When the connection electric wires 20 are connected with the electric wires 4 of the sub-wire harnesses 3a, 3b and 3c, as shown in FIG. 8, in the present embodiment, the intermediate connection terminals 16 are used. The terminal sections of the connection electric wires 20 are connected to one end of the bottom plate sections 16c of the intermediate connection terminals 16 by connection means 21. The intermediate connection terminals 16 connected with the connection electric wires 20 are set in arbitrary positions of the electric wire set grooves 14 of the insulating plates 13 composing the sub-wire harness connection plates 8a, 8b and 8c. When the electric wires 4 are inserted between the electric wire conductive sections 16a of the set intermediate connection terminals 16, or via the through connection conductors 9 which are inserted in to the through connection conductor connection sections 16b, the connection electric wires 20 are connected to the electric wires 4 of the sub-wire harnesses 3a, 3b and 3c which are passed through the sub-wire harness connection plates 8a, 8b and 8c.

In another example of the connection between the connection electric wires 20 and the electric wires 4 of the sub-wire harnesses 3a, 3b and 3c, as not shown in the drawings, 30 the electric wires 4 of the sub-wire harnesses 3a, 3b and 3c set to the sub-wire harness connection plates 8a, 8b and 8c are used and are extended to be drawn out. The drawn-out portions can be used as the connection electric wires 20. Moreover, the electric wires 4 of the sub-wire harnesses 3a, 3b and 3c set in the electric wire set grooves 14 of the insulating plates 13 composing the sub-wire harness connection plates 8a, 8b and 8c may be at the terminal or in the middle.

As shown in FIG. 7, in the electric connection box, the intermediate connection terminals 16 are set in predetermined positions of the electric wire set groves 14 of the insulating plates 13. The bare conductors 4a of the electric wires 4 composing the sub-wire harnesses 3a, 3b and 3c are put through and held by the sub-wire harness connection plates 8a, 8b and 8c. The sub-wire harnesses connection plates 8a, 8b and 8c are laminated each other. The through connection conductors 9 of the connector section 11 are inserted into the through holes 15 of the sub-wire harness connection plates 8a, 8b and 8c. The through connection conductors 9 are passed through and press-contact with the through connection conductor connections sections 16b which exist in the through holes 15 so as to be electrically connected. The through connection conductors 9 are electrically connected with the bare conductors 4a of the electric wires 4. As a result, a three-dimensional feed circuit is configured on the sub-wire harnesses 3a, 3b and 3c which are put through the sub-wire harness connection plates 8a, 8b and 8c.

According to such an electric connection box, when a number of the sub-wire harnesses 3a, 3b, 3c . . . increases, only a number of the laminated sub-wire harness connection plates 8a, 8b, 8c . . . increases. Even if a number of the sub-wire harnesses 3a, 3b, 3c . . . increases, the enlargement of the electric connection box can be suppressed as much as possible.

The through connection conductors 9 are electrically connected with the bare conductors 4a of the plural electric wires 4 which are put through the laminated sub-wire harness connection plates 8a, 8b and 8c. As a result, even if a number of the sub-wire harnesses 3a, 3b, 3c . . . increases, an increase in a number of the connectors to be used which are connected to the sub-wire harnesses 3a, 3b and 3c so as to form the circuit can be suppressed. Moreover, the circuit is configured on the sub-wire harnesses 3a, 3b and 3c which are put through the sub-wire harness connection plates 8a, 8b and 8c. As a result, the productivity of the wire harnesses is improved, and the cost can be lowered.

In addition, as for the circuit, the set position of the intermediate connection terminals 16 in the electric wire set grooves 14 of the insulating plates 13 and the supporting position of the through connection conductors 9 in the insulating housing 18 of the connector section 11 are determined in required positions or are changed. As a result, the change in design such as a modification of the circuit can be executed easily.

Further, in the electric connection box having such a structure, the power supply section is not provided, and the power supply connection connectors 111 which are connected to the power supply section is provided. As a result of the elimination of the power supply section, the electric connection box can be miniaturized, and the electric connection box and the power supply section can be attached to an automobile separately. As a result of a degree of freedom of the attachment to an automobile increases, and thus the attachment operation becomes easy.

The entire contents of Japanese Patent Applications P11-212331 (filed Jul. 27, 1999) and Japanese Patent Applications P11-212356 (filed Jul. 27, 1999) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. An electric connection box for connecting a plurality of sub-wire harnesses, comprising:

a power supply section having terminal sections;

a plurality of sub-wire harness connection plates laminated on the power supply section, each sub-wire harness connection plate having a plurality of set grooves to put electric wires of a sub-wire harness thereinto, each set groove having a plurality of through holes formed at a bottom thereof and spaced apart from each other in a longitudinal direction thereof;

a plurality of intermediate connection terminals, each intermediate connection terminal electrically connected to an electric wire of a sub-wire harness and set in a set groove of a sub-wire harness connection plate so that a through connection conductor connection section thereof is aligned with a through hole of the set groove; and a connection section having a plurality of through connection conductors, each through connection conductor connected to a terminal section of the power supply section after being inserted through a predetermined through hole in each of the sub-wire harness connection plates and connected to each through connection conductor connection section aligned with the predetermined through hole.

2. The electric connection box of claim 1, wherein the plurality of set grooves of each sub-wire harness connection plate are parallel to each other.

3. The electric connection box of claim 1, wherein the power supply section includes a connection plate supporting base section and the terminal sections are supported on the connection plate supporting base section.

4. The electric connection box of claim 3, wherein the plurality of sub-wire harness plates are laminated on the connection plate supporting base section.

5. The electric connection box of claim 1, wherein each set groove of each sub-wire harness connection plate includes a plurality of engagement concave sections and each through hole is positioned between two walls of an engagement concave section.

6. The electric connection box of claim 5, wherein the through connection conductor connection section of each intermediate connection terminal includes two elastic pieces configured to elastically contact the two walls of an engagement concave section to support and align the through connection conductor connection section with a through hole.

7. An electric connection box for connecting a plurality of sub-wire harnesses to a power supply section, comprising:
   a plurality of sub-wire harness connection plates laminated to each other, each sub-wire harness connection plate having a plurality of set grooves to put electric wires of a sub-wire harness thereinto, each set groove having a plurality of through holes formed at a bottom thereof and spaced apart from each other in a longitudinal direction thereof;
   a plurality of intermediate connection terminals, each intermediate connection terminal electrically connected to an electric wires of a sub-wire harness and set in a set groove of a sub-wire harness connection plate so that a through connection conductor connection section thereof is aligned with a through hole;
   a connection section having a plurality of through connection conductors, each through connection conductor being inserted through a predetermined through hole in each of the sub-wire harness connection plates and connected to each through connection conductor connection section aligned with the predetermined through hole; and
   a plurality of power supply connection connectors connectable to the power supply section, each power supply connection connector having connection electric wires electrically connected to the intermediate connection terminals in a sub-wire harness connection plate.

8. The electric connection box of claim 7, wherein the connection electric wires of each power supply connection connector are the electric wires of a sub-wire harness extended outside a sub-wire harness connection plate.

9. The electric connection box of claim 7, wherein the plurality of set grooves of each sub-wire harness connection plate are parallel to each other.

10. The electric connection box of claim 7, wherein each set groove of each sub-wire harness connection plate includes a plurality of engagement concave sections and each through hole is positioned between two walls of an engagement concave section.

11. The electric connection box of claim 10, wherein the through connection conductor connection section of each intermediate connection terminal includes two elastic pieces configured to elastically contact the two walls of an engagement concave section to support and align the through connection conductor connection section with a through hole.

* * * * *